KENWORTHY & POLLITT.
Axle Lubricator.

No. 97,651. Patented Dec. 7, 1869.

Attest. John Lockie
F. H. Philips

Inventors.
Wm. Kenworthy.
John H. Pollitt.
By their attorney S. S. Johnston

United States Patent Office.

WILLIAM KENWORTHY AND JOHN H. POLLITT, OF BUCHANAN, PENNSYLVANIA.

Letters Patent No. 97,651, dated December 7, 1869.

IMPROVEMENT IN OILING CARRIAGE AND CAR-AXLES.

The Schedule referred to in these Letters Patent and making part of the same.

*To all whom it may concern:*

Be it known that we, WILLIAM KENWORTHY and JOHN H. POLLITT, both of Buchanan, in the county of Allegheny, and State of Pennsylvania, have invented certain new and useful Improvements for Oiling Carriage, Wagon, and Car-Wheels; and we do hereby declare that the following is a full, clear, and exact description thereof, reference being had to the accompanying drawings, and to the letters of reference marked thereon.

The nature of our invention consists in providing the hub of a wheel for a carriage, wagon, or car, with an oil-chamber, which communicates with the interior of the hub by means of two oil-ways, which are so arranged as to distribute the oil on the axle or spindle, near the ends of the hub of the wheel; and also in providing the bore of the hub with gum washers and recess for oil.

To enable others skilled in the art to make and use our invention, we will proceed to describe its construction and operation.

In the accompanying drawings, which form part of our specification,

In the accompanying drawings—

Figure 1:
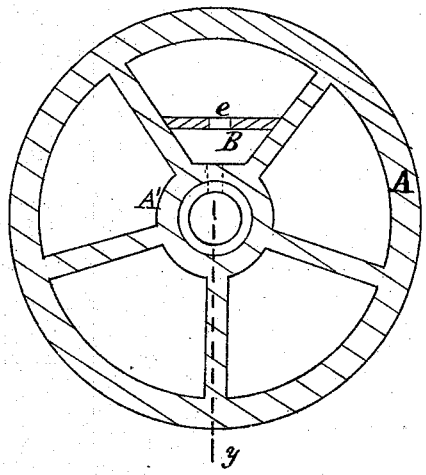
Figure 1 is a section of a car-wheel, and represents our improvement when the wheel is cut at line $y'$ of fig. 2.
Figure 2:
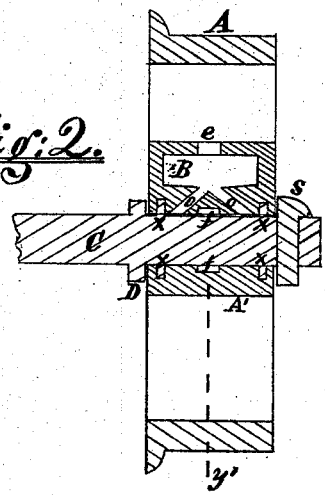
Figure 2 represents a transverse section of the same, when cut through at line $y$ of fig. 1.

A represents the wheel.

A', the hub of the same.

B represents the oil-chamber, which is provided with oil-ways, $o$, so arranged that they will distribute the oil on the axle C, near the ends of the hub.

The opening $e$, for supplying the oil-chamber B with oil, is so arranged, with relation to the oil-ways $o$, that they can be cleaned out with ease and facility.

The bore of the hub A' is provided with recesses, into which are fitted gum washers, $x$, which fit closely and neatly around the axle C. The washers are used for the purpose of preventing the oil from flowing out at the ends of the hub of the wheel.

The hub is also provided with a recess, $f$, for receiving oil as it flows on the axle from the ends of the hub toward its centre.

D represents the collar, or flange, on the axle.

S represents the linchpin.

The wheel and axle represented in the accompanying drawings are such as are used on the trucks of "coal-cars."

The advantage of our improvement consists in distributing the oil on axles at the points where it is most needed, and in saving oil, labor, and time, in oiling wheels, and in so arranging the opening for supplying the oil-chamber with oil, that the oil-ways may be cleaned out with ease and facility.

Having thus described our improvement for oiling wheels,

What we claim as of our invention, is—

The combinanation and arrangement of the oil-chamber B, oil-ways $o$, gum washers $x$, and recess $f$, constructed, arranged, and operating as herein described, and for the purpose set forth.

WM. KENWORTHY.
JOHN H. POLLITT.

Witnesses:
JAMES J. JOHNSTON,
JOHN LOCKIE.